(No Model.) 2 Sheets—Sheet 1.
W. J. MUNCASTER.
WORK HOLDER.
No. 409,367. Patented Aug. 20, 1889.
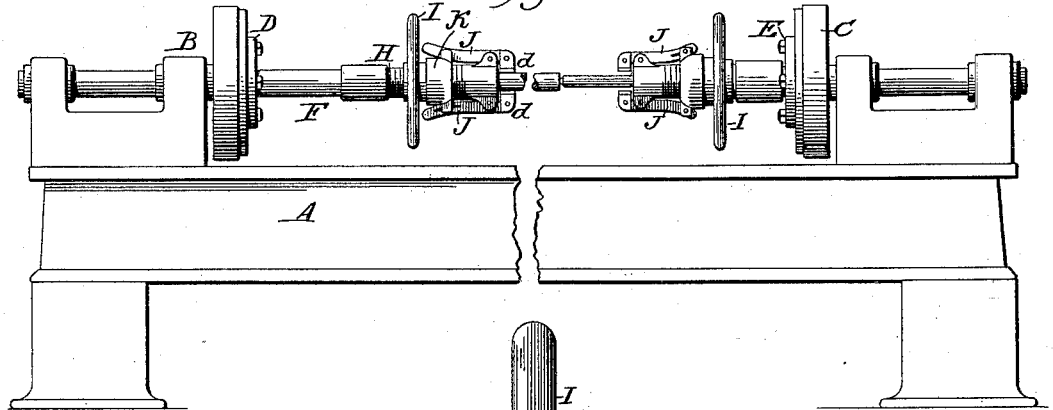
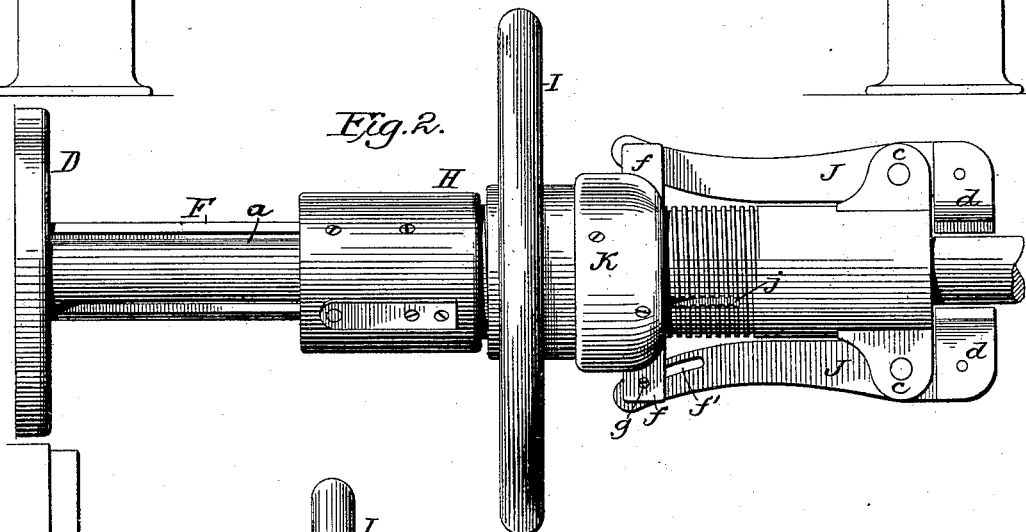
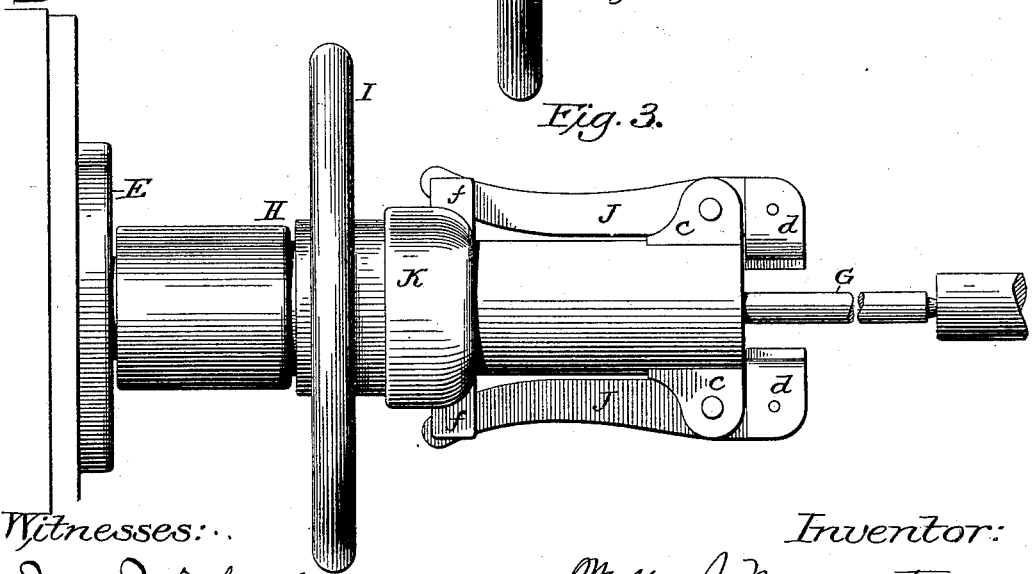
Witnesses:
James P. Duhamel
Horace A. Dodge
Inventor:
Walter J. Muncaster,
by Dodge Sons
Attys.

(No Model.) 2 Sheets—Sheet 2.

W. J. MUNCASTER.
WORK HOLDER.

No. 409,367. Patented Aug. 20, 1889.

Witnesses:
James F. Duhamel
Horace A. Dodge

Inventor:
Walter J. Muncaster,
by Dodge Sons,
Attys.

UNITED STATES PATENT OFFICE.

WALTER J. MUNCASTER, OF CUMBERLAND, MARYLAND, ASSIGNOR OF ONE-HALF TO MERWIN McKAIG, OF SAME PLACE.

WORK-HOLDER.

SPECIFICATION forming part of Letters Patent No. 409,367, dated August 20, 1889.

Application filed May 31, 1889. Serial No. 312,762. (No model.)

*To all whom it may concern:*

Be it known that I, WALTER J. MUNCASTER, a citizen of the United States, residing at Cumberland, in the county of Alleghany and State of Maryland, have invented certain new and useful Improvements in Work-Holders, of which the following is a specification.

My invention consists in a chuck or work-holder for lathes capable of being moved back away from the work in the direction of the axis of the latter, to permit the cutting-tool to work to or over the end, as hereinafter more fully set forth.

Figure 4:
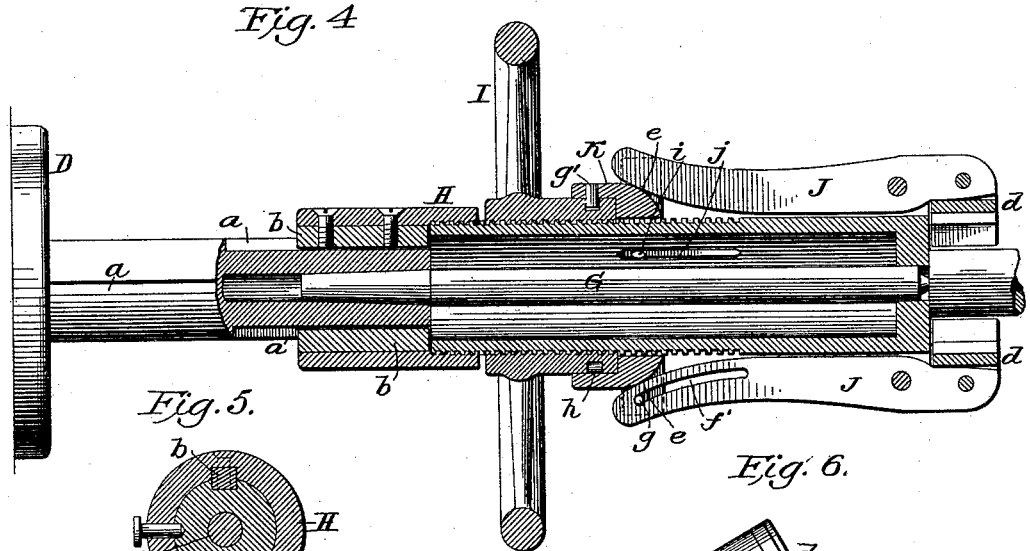
Figure 5:
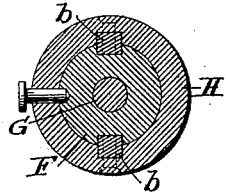
Figure 6:
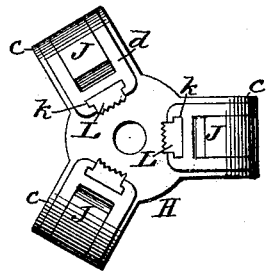

Figure 1 of the accompanying drawings represents a lathe provided with my improved chuck at both the head and the tail stocks; Fig. 2, a view of one of the chucks, on a larger scale, showing the jaws grasping the work; Fig. 3, a similar view, but showing the jaws spread and moved back from the work; Fig. 4, a longitudinal view of the same; Fig. 5, a cross-section on the line $xx$, Fig. 2; Fig. 6, an end view of the chuck.

In the practical use of lathes and like machinery considerable difficulty is experienced in finishing the end portions of work, owing to the fact that one or both ends is or are usually grasped by the jaws of a chuck, a lathe-dog, or other work-holding device, which precludes the action of the tool upon said portion or portions while so held. It is therefore customary to finish or dress the work up to the holding device, then to substitute a center spindle for the holding device at the tail of the lathe, if one be used there, and finish the work at that end, and finally to dismount the work and turn it end for end to finish off at the tail and while supported by the center spindle that portion previously covered by the chuck or holder at the head of the lathe. This common plan not only involves loss of time and consequent increase of cost, but it is attended with the difficulty and in many cases impossibility of perfectly recentering the work.

My invention is designed to obviate existing difficulties, and may be readily understood upon referring to the drawings, in connection with the following description.

A indicates the bed or frame of a lathe of any description, or of any machine of that general class, and B C, respectively, the head and tail stocks, one or both of which may be driven by belt, gearing, or otherwise, as is customary in machines of this order, the gearing or driving apparatus constituting no part of the present invention.

D indicates a face-plate or disk, formed upon or secured to the mandrel of the head-stock B, and E a similar face-plate or disk formed with or secured upon the mandrel of the tail-stock C.

Secured to each of the face-plates or disks, advisably, or to only one thereof, if preferred, is a tubular arbor F, constituting an extension of the mandrel of the lathe and fitted to receive the rear end of a center-pin or spindle G, upon which the work may be centered and supported in whole or in part. The arbor or extension F is furnished with longitudinal grooves $a$ in its outer face to receive and guide internal feathers or splines $b$ of an encircling tubular shell H, which is of an internal diameter to fit and slide freely, but closely, upon the arbor F, and is perforated at its front end to permit the spindle G to protrude. The shell is externally threaded through a portion of its length and carries a hand-wheel I, the hub of which is threaded to correspond with the thread of the shell, and constitutes in effect a nut. At its forward end the shell H is formed with lugs or ears $c$, in or between which are pivoted two or more levers J, the number being optional—from two upward.

Each of the levers J is formed or furnished with a jaw $d$ to grasp the work, and is curved or beveled at its rear end, as shown, to permit the entrance between it and the shell of a collar or ring K, which serves to spread the rear ends of the levers and throw their forward ends together. In practice I find it preferable to form the collar K with a beveled bearing-face $e$ for each lever J between two lugs or ears $f$, and to form said levers each with a slot $f'$, to receive a pin $g$ passing through said ears, so that when the collar is moved back the levers shall be drawn inward at their rear ends and separated at their forward ends, positively.

The collar K is moved forward and backward by means of the nut or hand-wheel I, connection being made between said parts by means of a pin $g'$, carried by the collar and entering a circumferential groove $h$, formed in the hub of the wheel or nut I. This connection permits the collar K to partake of the motion of the nut or wheel I lengthwise of the shell H without also partaking of its rotation, a pin $i$ projecting from collar K into a groove or slot $j$ in the shell, and thereby preventing rotation of the collar K upon or independently of the shell.

The shell H is represented as made in two parts and screwed together—a construction adopted merely for convenience and lightness, and to avoid making the shell of the same diameter throughout and extending the thread to its rear end.

It is desirable that the device be capable of ready adjustment or adaptation to shafts, rods, or other work of widely-varying sizes or diameters in those portions which enter the chucks or holders, and the comparatively limited adjustment of the levers does not give as wide range as will frequently be desirable. This difficulty may be overcome by the adoption of other forms of chuck—as, for instance, the well-known scroll-chuck—but I prefer to use the levers J and collar K, and to form the levers each with a T-shaped or dovetail groove $k$ to receive a jaw L. The adjustable jaws are not essential, and may be omitted. These jaws will be made of greater or less measurement in a direction radial to the axis of the chuck as they stand in use, and, being readily interchangeable, serve to quickly adapt the chuck or holder to the particular work to be done. They also permit by due selection of the jaws the clamping or holding of eccentric bodies or of circular bodies in an eccentric position.

The jaws may be roughened or smooth and varied as to the form of their bearing-faces, as desired.

The work holders or chucks being thus constructed, one is applied to the mandrel of the head-stock and another to that of the tail-stock, or to either alone, as found expedient, though the greatest efficiency is attained by the use of two, the head and tail stock mandrels being both positively driven.

While the tool is working upon that portion of a shaft or body between the chucks and not covered by the jaws thereof the shells H will be advanced and the jaws caused to clamp the work; but whenever the tool reaches or nears the portion held by the jaws the hand-wheel will be turned to recede the collar K, and thereby to spread the jaws and release their hold upon the work, whereupon the hand-wheel, collar, shell, and jaws will be slid back, leaving the end of the shaft or work uncovered, but centered and supported in whole or in part by the spindle G. This explanation applies equally to both chucks.

The screw-threads of the shells may be either right or left hand, and as they are one or the other the jaws may be opened or closed by merely grasping and holding the hand-wheels while the mandrels continue to rotate in their normal direction. A reversal of direction of rotation will of course cause a reverse action of the parts.

The central spindle G is not absolutely necessary, though I deem it wise to employ it, even where intermediate supporting and centering devices are used.

The essence of my invention resides in the adjustability of the chuck longitudinally without moving or in any manner interfering with either the head-stock or the tail-stock, and, as above intimated, the details of construction may be varied considerably, such variations falling rather within the field of the mechanic than of the inventor. Thus, for instance, any well-known form of chuck having an open center may be employed, a different catch or locking device may be substituted for the spring-catch shown, the arbor or extension F may be of polygonal form instead of cylindrical, and the use of splines or feathers thereby avoided, or the collar K may be dispensed with and the hub of wheel or nut I made conical. Such variations I consider as fully embraced within the scope of my invention.

Having thus described my invention, what I claim is—

1. In combination with a lathe-stock and its mandrel, a chuck or work-holder adjustable longitudinally with reference thereto.

2. In combination with a lathe-stock and with a mandrel thereof projecting beyond the stock, a chuck or work-holder mounted and arranged to be moved longitudinally upon said mandrel to and from the work.

3. In combination with a lathe-stock and a mandrel thereof projecting beyond said stock, a center spindle or point carried by the mandrel and a chuck or work-holder movable upon said spindle to cover or uncover the point or spindle and the end of the work.

4. In combination with a lathe-mandrel, a shell or casing arranged to slide longitudinally thereon, but to rotate therewith, levers carried by said shell and provided with clamping-jaws, a collar arranged to move longitudinally upon said shell and to actuate said levers, and a nut screwing upon the shell and serving to move the collar relatively to the levers, substantially as described and shown.

5. In combination with a lathe-stock, the herein-described work-holder or chuck consisting of arbor F, shell H, wheel or nut I, threaded upon the shell, levers J, having clamping-jaws, and collar K, having a swivel-connection with nut I.

6. In combination with arbor F, longitudinally-adjustable shell H, nut I, collar K, and levers J, all constructed and arranged to operate substantially as set forth, and detachable jaws L, applied to the levers, substantially as shown and described.

7. In combination with arbor F, movable shell H, nut I, and levers J, and central spindle G, carried by the arbor F.

In witness whereof I hereunto set my hand in the presence of two witnesses.

WALTER J. MUNCASTER.

Witnesses:
MERWIN McKAIG,
C. SMITH, Jr.